US012569866B2

(12) United States Patent
Kuribayashi et al.

(10) Patent No.: US 12,569,866 B2
(45) Date of Patent: Mar. 10, 2026

(54) POWDER SUCTION AND DISCHARGE APPARATUS

(71) Applicant: SEIKO EPSON CORPORATION, Tokyo (JP)

(72) Inventors: Homare Kuribayashi, Ikeda (JP); Masato Hanamura, Shiojiri (JP); Koji Imamura, Shiojiri (JP); Koki Yamakawa, Chino (JP); Hirokazu Yamaga, Chino (JP)

(73) Assignee: SEIKO EPSON CORPORATION (JP)

( * ) Notice: Subject to any disclaimer, the term of this patent is extended or adjusted under 35 U.S.C. 154(b) by 765 days.

(21) Appl. No.: 17/891,477

(22) Filed: Aug. 19, 2022

(65) Prior Publication Data

US 2023/0058983 A1 Feb. 23, 2023

(30) Foreign Application Priority Data

Aug. 20, 2021 (JP) ................................ 2021-134773

(51) Int. Cl.
*B05B 7/14* (2006.01)

(52) U.S. Cl.
CPC .......... *B05B 7/1472* (2013.01); *B05B 7/1445* (2013.01); *B05B 7/1486* (2013.01)

(58) Field of Classification Search
None
See application file for complete search history.

(56) References Cited

U.S. PATENT DOCUMENTS

| | | | | |
|---|---|---|---|---|
| 2,434,723 | A * | 1/1948 | Shook | B01L 3/0203 422/514 |
| 2006/0011653 | A1* | 1/2006 | Fontaine | G01G 13/024 222/181.1 |
| 2007/0257224 | A1* | 11/2007 | Butruille | B67D 3/047 251/304 |
| 2008/0185401 | A1 | 8/2008 | Luchinger | |
| 2008/0236701 | A1* | 10/2008 | Monti | B65B 1/36 222/630 |
| 2016/0122138 | A1 | 5/2016 | Mauchle et al. | |

FOREIGN PATENT DOCUMENTS

| | | |
|---|---|---|
| JP | 2009-509877 A | 3/2009 |
| JP | 2018-158293 A | 10/2018 |

* cited by examiner

*Primary Examiner* — Charles Capozzi
(74) *Attorney, Agent, or Firm* — Harness, Dickey & Pierce, P.L.C.

(57) ABSTRACT

A powder suction and discharge apparatus including a pipe, a container that is coupled to the pipe, a valve that opens and closes a passage of the pipe, and a pressure reducing mechanism that causes an internal space of the container to have negative pressure, in which in a first state in which the valve is open and the pressure reducing mechanism is driven, powder is sucked into the container through the pipe, in a second state in which the valve is closed, the sucked powder is stored in the container, and in a third state in which the valve is open, the stored powder is discharged through the pipe.

4 Claims, 5 Drawing Sheets

POWDER SUCTION AND DISCHARGE APPARATUS

The present application is based on, and claims priority from JP Application Serial Number 2021-134773, filed Aug. 20, 2021, the disclosure of which is hereby incorporated by reference herein in its entirety.

BACKGROUND

1. Technical Field

The present disclosure relates to a powder suction and discharge apparatus.

2. Related Art

An apparatus for dispensing a prescribed amount of powder has been known.

For example, JP-T-2009-509877 describes a dispenser device that controls a flow rate when supplying a powder material by making use of a mechanism in which a discharge port partly opens when a delivery/closing unit is moved along the longitudinal center axis and a recess is located in the discharge port, and a passage opening through which the powder material to be supplied passes is defined.

However, the dispenser device of JP-T-2009-509877 needs to supply powder manually by using, for example, a medicine spoon and the like from a reagent bottle. Accordingly, splashing or contamination of the powder may occur.

SUMMARY

According to an aspect of the present disclosure, a powder suction and discharge apparatus includes a pipe, a container that is coupled to the pipe, a valve that opens and closes a passage of the pipe, and a pressure reducing mechanism that causes an internal space of the container to have negative pressure, and in a first state in which the valve is open and the pressure reducing mechanism is driven, powder is sucked into the container through the pipe, in a second state in which the valve is closed, the sucked powder is stored in the container, and in a third state in which the valve is open, the stored powder is discharged through the pipe.

DESCRIPTION OF EXEMPLARY EMBODIMENTS

Hereinafter, a preferred embodiment of the present disclosure will be described in detail with reference to the drawings. Note that the embodiment described below does not unduly limit the contents of the present disclosure described in the claims. In addition, all the configurations described below are not necessarily essential elements of the present disclosure.

1. Powder Suction and Discharge Apparatus 1.1 Configuration

Figure 1:
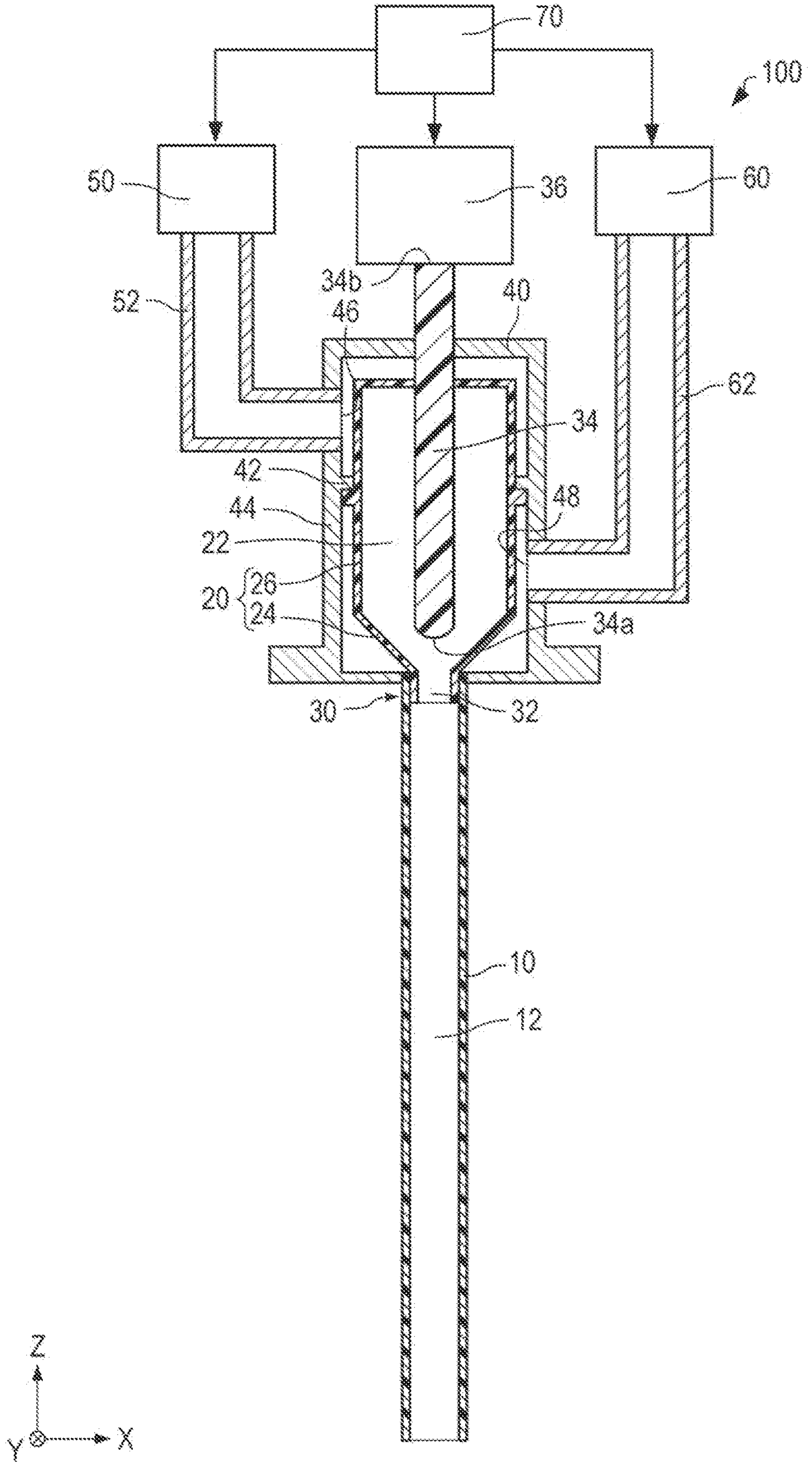
FIG. 1 is a sectional view schematically illustrating a powder suction and discharge apparatus according to the present embodiment.
Figure 2:
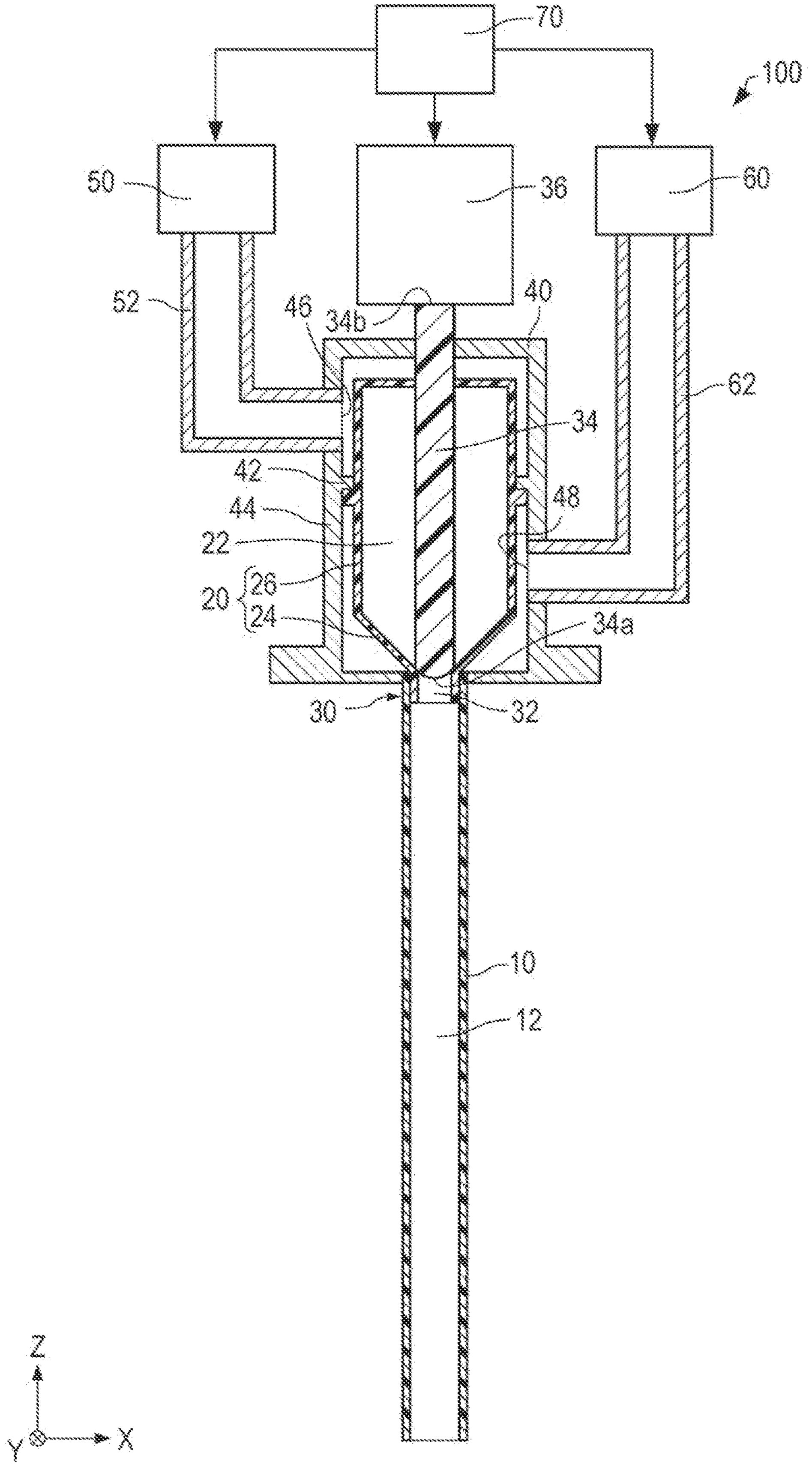
FIG. 2 is a sectional view schematically illustrating the powder suction and discharge apparatus according to the present embodiment.
Figure 3:
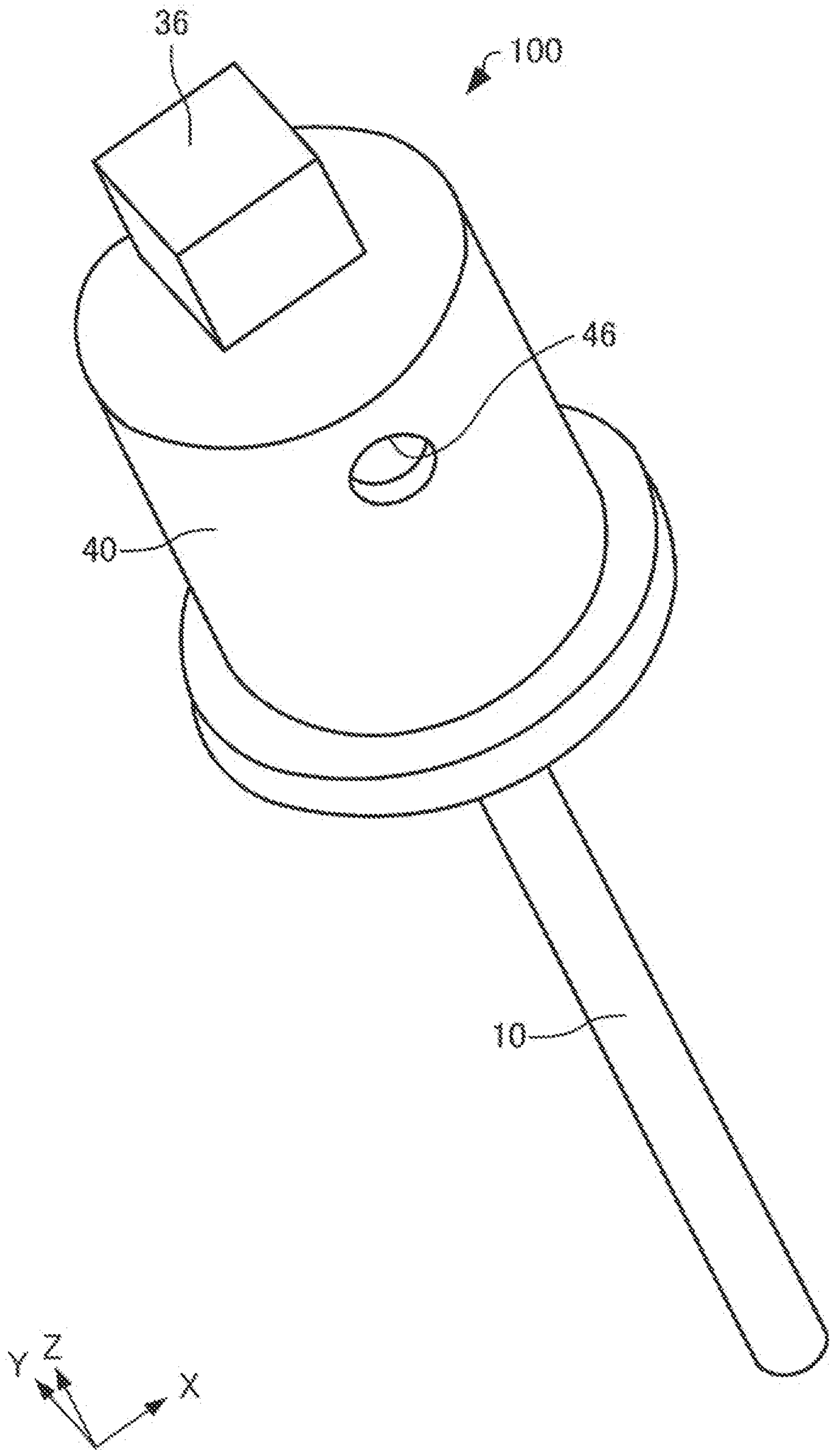
FIG. 3 is a perspective view schematically illustrating the powder suction and discharge apparatus according to the present embodiment.

First, a powder suction and discharge apparatus according to the present embodiment will be described with reference to the drawings. FIGS. 1 and 2 are sectional views schematically illustrating a powder suction and discharge apparatus 100 according to the present embodiment. FIG. 3 is a perspective view schematically illustrating the powder suction and discharge apparatus 100 according to the present embodiment. Note that in FIGS. 1 to 3, an X-axis, a Y-axis and a Z-axis are illustrated as three axes that mutually intersect. An X-axis direction and a Y-axis direction are, for example, a horizontal direction. A Z-axis direction is, for example, a vertical direction.

The powder suction and discharge apparatus 100 sucks powder such as pigment and discharges the powder. As FIGS. 1 to 3 illustrate, the powder suction and discharge apparatus 100 includes a pipe 10, a container 20, a valve 30, a housing 40, a pressure reducing mechanism 50, a pressurizing mechanism 60, and a control unit 70. Note that FIG. 1 illustrates a state in which the valve 30 is open, and FIG. 2 illustrates a state in which the valve 30 is closed. In addition, for convenience, the pressure reducing mechanism 50, the pressurizing mechanism 60, and the control unit 70 are not illustrated in FIG. 3.

The pipe 10 extends from the container 20. In the illustrated example, the pipe 10 extends in the −Z axis direction. As FIGS. 1 and 2 illustrate, the pipe 10 is provided with a passage 12 through which powder passes. The powder is stored in the container 20 through the passage 12. Moreover, the powder stored in the container 20 is discharged to the outside through the passage 12. The material of the pipe 10 is not particularly limited, but is, for example, polyethylene, polypropylene, polyurethane, polyamide, polyimide, polyamide imide, polytetrafluoroethylene, and the like.

The container 20 is coupled to the pipe 10. An internal space 22 of the container 20 can be coupled to the passage 12 of the pipe 10. The container 20 can store powder. The container 20 has a tapered portion 24 in which the width of the internal space 22 increases toward the +Z axis direction and a constant width portion 26 in which the width of the internal space 22 is constant in the +Z axis direction. The constant width portion 26 has a column shape. In the example illustrated in FIGS. 1 and 2, the width is the size in the X-axis direction. The constant width portion 26 is located in the +Z axis direction of the tapered portion 24.

The material of the container 20 is, for example, a porous resin. The porous resin is not particularly limited, but is, for example, polyethylene, polypropylene, polyurethane, polyamide, polyimide, polyamide imide, polytetrafluoroethylene, and the like. The average value of pore diameter of the porous resin is, for example, 2 μm or more and 30 μm or less, preferably 2 μm or more and 10 μm or less, more preferably 3 μm or more and 8 μm or less, and further more preferably 4 μm or more and 6 μm or less. When the average value of pore diameter of the porous resin is 2 μm or more, the pressure reducing mechanism 50 can easily cause the internal space 22 of the container 20 to have negative pressure. When the average value of pore diameter of the porous resin is 30 μm or less, the powder can be suppressed from spilling through a pore.

The valve 30 opens and closes the passage 12 of the pipe 10. The valve 30 is configured with, for example, a coupling portion 32 between the pipe 10 and the container 20 and a rod member 34 that can be fit in the coupling portion 32.

The coupling portion 32 is an opening into which the rod member 34 is inserted. In the illustrated example, the coupling portion 32 is provided in a portion where the pipe 10 and the container 20 overlap with each other when viewed in the X-axis direction. The shape of the coupling portion 32 when viewed in the Z-axis direction is not particularly limited, but is, for example, round.

The rod member 34 is fit in the coupling portion 32. Specifically, a tip 34*a* of the rod member 34 is fit in the coupling portion 32. FIG. 1 illustrates a state in which the rod member 34 is not fit in the coupling portion 32. This means that FIG. 1 illustrates a state in which the valve 30 is open. FIG. 2 illustrates a state in which the rod member 34 is fit in the coupling portion 32. This means that FIG. 2 illustrates a state in which the valve 30 is closed. In the illustrated example, the rod member 34 extends in the Z-axis direction.

An end 34*b* of the rod member 34 is provided with a moving mechanism 36. As the moving mechanism 36 is driven, the rod member 34 can move along the Z-axis. The moving mechanism 36 includes a motor and the like. In the illustrated example, the tip 34*a* is one end portion of the rod member 34 in the −Z axis direction. The end 34*b* is an end portion of the rod member 34 in the +Z axis direction.

The material of the rod member 34 is, for example, a conductive resin. The electric resistivity of the rod member 34 is lower than the electric resistivity of the pipe 10 and the electric resistivity of the container 20. The conductive resin is not particularly limited, but is, for example, a conductive polymer such as polyethylenedioxythiophene, polyaniline, and polypyrrole, or carbon paste using graphite or a carbon nanotube.

The rod member 34, the container 20, and the pipe 10 are, for example, disposable members that can be replaced for each type of powder. As a result, the powder can be suppressed from being contaminated. The materials of the rod member 34, the container 20, and the pipe 10 are preferably inexpensive resin. As a result, the running cost can be suppressed.

The housing 40 accommodates the container 20. The pipe 10 is not accommodated in the housing 40. The housing 40 has, for example, a substantially column shape. The housing 40 has a supporting portion 42 that supports the container 20. In the illustrated example, the supporting portion 42 projects from a side wall 44 of the housing 40 in the X-axis direction and supports the constant width portion 26 of the container 20. The material of the housing 40 is not particularly limited, but is, for example, metal, resin, and the like.

The pressure reducing mechanism 50 is coupled to the housing 40 via a first communication pipe 52. In the illustrated example, the first communication pipe 52 is coupled to a first coupling port 46 provided on the side wall 44 of the housing 40. The first coupling port 46 is located in the +Z axis direction from the supporting portion 42.

The pressure reducing mechanism 50 causes the internal space 22 of the container 20 to have negative pressure via the first communication pipe 52. Specifically, the pressure reducing mechanism 50 sucks air of the internal space 22 via the first communication pipe 52 so as to make the pressure of the internal space 22 lower than the pressure outside the housing 40. Since the material of the container 20 is a porous resin, the air of the internal space 22 can be sucked by the pressure reducing mechanism 50. The pressure reducing mechanism 50 is configured by, for example, a vacuum pump and the like.

The pressurizing mechanism 60 is coupled to the housing 40 via a second communication pipe 62. In the illustrated example, the second communication pipe 62 is coupled to a second coupling port 48 provided on the side wall 44 of the housing 40. The second coupling port 48 is located on the −Z axis direction from the supporting portion 42.

The pressurizing mechanism 60 applies pressure to the internal space 22 of the container 20 via the second communication pipe 62. Specifically, the pressurizing mechanism 60 sends air to the internal space 22 via the second communication pipe 62. Since the material of the container 20 is a porous resin, air can be sent to the internal space 22 by the pressurizing mechanism 60. The pressurizing mechanism 60 is configured by, for example, a pressurizing pump and the like. The pressurizing mechanism 60 blows air to the powder from the container 20.

The control unit 70 is configured by, for example, a computer having a processor, a main storage, and an input/output interface that inputs and outputs a signal from or to the outside. The control unit 70 exhibits various functions, for example, as the processor performs a program read in the main storage. Specifically, the control unit 70 controls the moving mechanism 36, the pressure reducing mechanism 50, and the pressurizing mechanism 60. Note that the control unit 70 may be configured by a combination of multiple circuits, instead of a computer.

1.2 Operation

Figure 4:
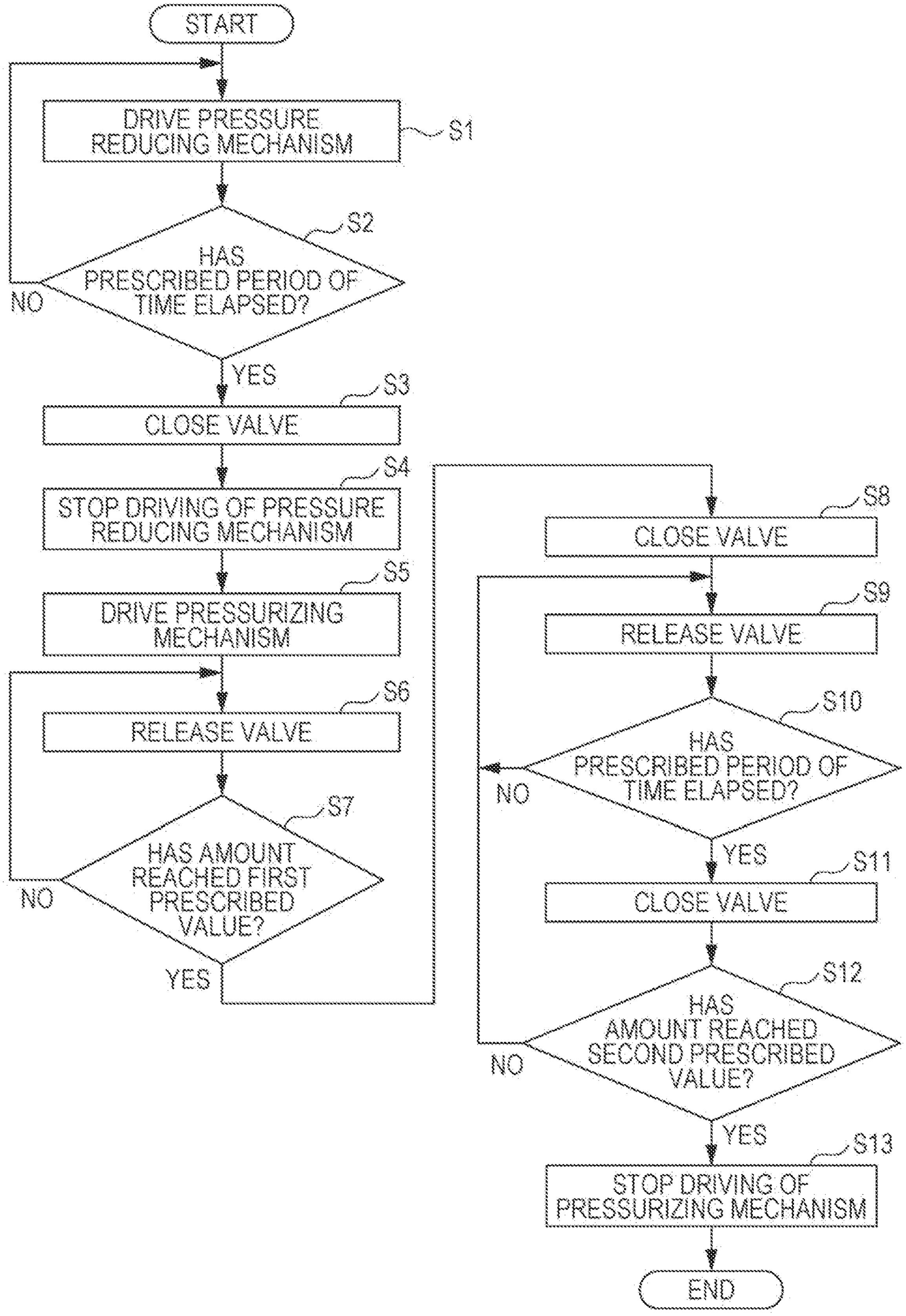
FIG. 4 is a flow chart for explaining processing of a control unit of the powder suction and discharge apparatus according to the present embodiment.

Next, operation of the powder suction and discharge apparatus 100 will be described. Specifically, processing of the control unit 70 of the powder suction and discharge apparatus 100 will be described with reference to the drawings. FIG. 4 is a flow chart for explaining processing of the control unit 70.

After the user inserts the pipe 10 into a reagent bottle containing prescribed powder, for example, the user operates an operation unit (not illustrated) to output, to the control unit 70, a processing start signal for starting processing. The operation unit is achieved by a mouse, a keyboard, a touch panel, and the like. Upon receiving the processing start signal, the control unit 70 starts processing.

First, as FIG. 4 illustrates, the control unit 70 performs processing for driving the pressure reducing mechanism 50 (step S1). As a result, the internal space 22 of the container 20 has negative pressure. In step S1, as FIG. 1 illustrates, the valve 30 is open. In a first state in which the valve 30 is open and the pressure reducing mechanism 50 is driven, the powder is sucked into the container 20 through the pipe 10.

Next, the control unit 70 performs processing for determining whether or not a prescribed period of time has elapsed since the pressure reducing mechanism 50 was driven (step S2). When it is determined that the prescribed period of time has not elapsed (No in step S2), the control unit 70 returns the processing to step S1.

On the other hand, when it is determined that the prescribed period of time has elapsed (Yes in step S2), as FIG. 2 illustrates, the control unit 70 performs processing for closing the valve 30 (step S3). Specifically, the control unit 70 drives the moving mechanism 36 to move the rod member 34 in the −Z axis direction and fits the rod member 34 in the coupling portion 32 so as to close the valve 30. In a second state in which the valve 30 is closed, the sucked powder is stored in the container 20.

Next, the control unit 70 performs processing for stopping driving of the pressure reducing mechanism 50 (step S4).

Thereafter, for example, the user disposes an electronic balance (not illustrated) immediately below the pipe 10. Note that the control unit 70 may simultaneously perform processing for closing the valve 30 (step S3) and processing for stopping driving of the pressure reducing mechanism 50 (step S4).

Next, the control unit 70 performs processing for driving the pressurizing mechanism 60 (step S5). At the same time, the control unit 70 performs processing for driving the pressure reducing mechanism 50. As a result, while the internal space 22 of the container 20 maintains the atmospheric pressure, a state in which air is blown to the powder from the container 20, which is in contact with the powder, is made, and fluidity of the powder is enhanced.

Next, as FIG. 1 illustrates, the control unit 70 performs processing for opening the valve 30 (step S6). Specifically, the control unit 70 drives the moving mechanism 36 to move the rod member 34 in the +Z axis direction and releases fitting between the rod member 34 and the coupling portion 32 so as to open the valve 30. In a third state in which the valve 30 is open and the pressure reducing mechanism 50 and the pressurizing mechanism 60 are driven, the stored powder is discharged through the pipe 10. The powder is discharged onto the electronic balance. Note that the control unit 70 may simultaneously perform processing for driving the pressurizing mechanism 60 (step S5) and processing for opening the valve 30 (step S6).

Next, based on the signal from the electronic balance, the control unit 70 performs processing for determining whether or not the amount of the powder discharged onto the electronic balance has reached a first prescribed value (step S7). The first prescribed value is smaller than a second prescribed value, which is the target value. For example, when the second prescribed value, which is the target value, is 100 grams, the first prescribed value is 90 grams. When it is determined that the amount has not reached the first prescribed value (No in step S7), the control unit 70 returns the processing to step S6.

On the other hand, when it is determined that the amount has reached the first prescribed value (Yes in step S7), similarly to step S3, the control unit 70 performs processing for closing the valve 30 (step S8).

Next, similarly to step S6, the control unit 70 performs processing for opening the valve 30 (step S9).

Next, the control unit 70 performs processing for determining whether or not the prescribed period of time has elapsed since the valve 30 was opened in step S9 (step S10). The prescribed period of time in step S10 is sufficiently shorter than the prescribed period of time in step S2. When it is determined that the prescribed period of time has not elapsed (No in step S10), the control unit 70 returns the processing to step S9.

On the other hand, when it is determined that the prescribed period of time has been elapsed (Yes in step S10), similarly to step S3, the control unit 70 performs processing for closing the valve 30 (step S11). Through the processing of steps S9 to S11, for example, the powder can be discharged in a few milligram units.

Next, based on the signal from the electronic balance, the control unit 70 performs processing for determining whether or not the amount of the powder discharged onto the electronic balance has reached the second prescribed value (step S12). When it is determined that the amount has not reached the second prescribed value (No in step S12), the control unit 70 returns the processing to step S9.

On the other hand, when it is determined that the amount has reached the second prescribed value (Yes in step S12), the control unit 70 performs processing for stopping driving of the pressurizing mechanism 60 (step S13). Then, the control unit 70 ends the processing.

Note that in the above description, an example in which the processing is performed until step S13 has been explained, but when, in step S7, it is determined whether or not the amount of the powder discharged onto the electronic balance has reached the second prescribed value, which is the target value, and in a case where it is determined that the amount has reached the second prescribed value, the control unit 70 may end the processing after closing the valve 30 so as to stop driving of the pressurizing mechanism 60

In addition, in the above description, an example in which the user inserts the pipe 10 into a reagent bottle has been explained, but the powder suction and discharge apparatus 100 may be configured such that an ultrasonic wave sensor that detects powder is included, and when the ultrasonic wave sensor detects the powder, the pipe 10 automatically approaches the powder and comes into contact with the powder. In this case, when the pipe 10 comes into contact with the powder, the control unit 70 starts the processing of step S1.

In addition, in the above description, an example in which, in step S2, it is determined whether or not the prescribed time has elapsed since the pressure reducing mechanism 50 was driven, but the reagent bottle may be mounted on the electronic balance, and based on the signal from the electronic balance, the control unit 70 may determine whether or not the amount of the powder sucked from the reagent bottle mounted on the electronic balance has reached the prescribed value. Compared to determination based on time, determination based on the weight as described above can reduce the processing time. When determination is performed based on time, a desired amount may not be sucked during a prescribed period of time depending on the property of the powder, and the processing may need to be performed again from the beginning in some cases. On the other hand, when determination is performed based on the weight, since the amount of the sucked powder is not substantially deviated from the desired amount, the processing time can be reduced.

In addition, suction of the powder may be performed two or more separated times. In this case, an adjustment is made such that roughly the amount of the powder near the desired amount is sucked in the first suction operation, and the desired amount is sucked in the second suction operation, as a result of which the amount to be sucked can be more accurately controlled. In particular, when the value of the electronic balance is not stabilized during a suction operation, it is difficult to suck the desired amount in one suction operation, and thus this method is more effective.

1.3 Effects

The powder suction and discharge apparatus 100 includes the pipe 10, the container 20 that is coupled to the pipe 10, the valve 30 that opens and closes the passage 12 of the pipe 10, and the pressure reducing mechanism 50 that causes the internal space 22 of the container 20 to have negative pressure. In addition, in the first state in which the valve 30 is open and the pressure reducing mechanism 50 is driven, powder is sucked into the container 20 through the pipe 10, in the second state in which the valve 30 is closed, the sucked powder is stored in the container 20, and in the third state in which the valve 30 is open, the stored powder is discharged through the pipe 10. In this manner, in the powder suction and discharge apparatus 100, powder can be sucked and discharged through the pipe 10. Accordingly, for example, compared to a case where powder is supplied to an apparatus using a medicine spoon, the possibility of splashing or contamination of the powder can be reduced.

The powder suction and discharge apparatus 100 includes the pressurizing mechanism 60 that blows air to the powder from the container 20, and in the third state, the pressurizing mechanism 60 is driven. Accordingly, in the powder suction and discharge apparatus 100, compared to a case where no pressurizing mechanism is provided, the powder can be suppressed from adhering to a side wall of the container 20, and the discharge speed of the powder can be stabilized. As a result, the powder can be discharged while having a high fluidity like a liquid and can be dispensed highly accurately.

In the powder suction and discharge apparatus 100, the material of the container 20 is a porous resin. As a result, in the powder suction and discharge apparatus 100, the pressure reducing mechanism 50 provided outside the container 20 can cause the internal space 22 of the container 20 to have negative pressure.

In the powder suction and discharge apparatus 100, the valve 30 is configured with the coupling portion 32 between the pipe 10 and the container 20 and the rod member 34 that is configured to be fit in the coupling portion 32. As a result, in the powder suction and discharge apparatus 100, by moving the rod member 34, the valve 30 can open and close.

In the powder suction and discharge apparatus 100, the material of the rod member 34 is a conductive resin. As a result, in the powder suction and discharge apparatus 100, compared to a case where the rod member has insulating properties, the possibility of adhesion of powder to the rod member 34 due to static electricity caused by friction can be reduced.

2. Modification of Powder Suction and Discharge Apparatus

Figure 5:
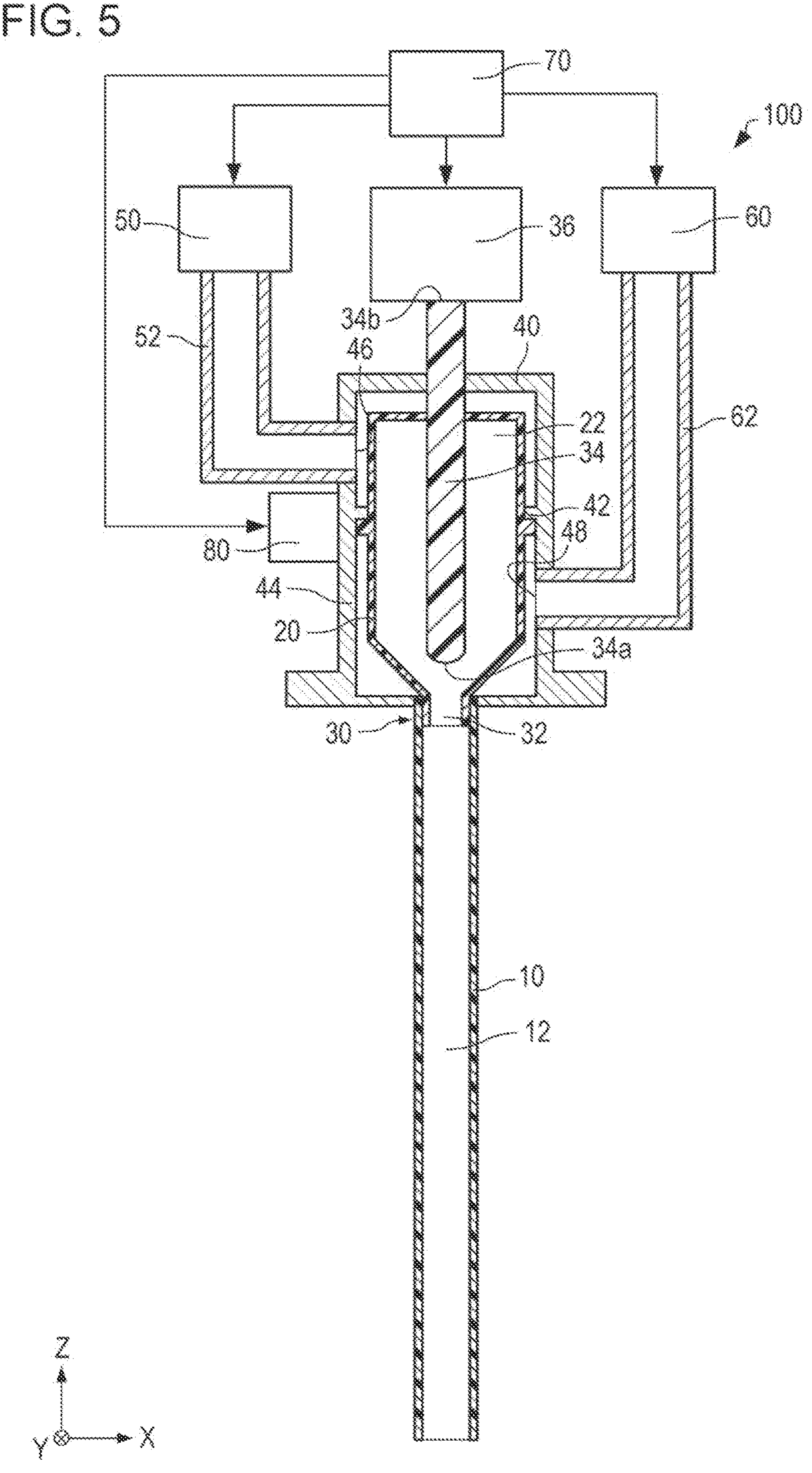
FIG. 5 is a sectional view schematically illustrating a powder suction and discharge apparatus according to a modification of the present embodiment.

Next, a powder suction and discharge apparatus according to a modification of the present embodiment will be described with reference to the drawings. FIG. 5 is a sectional view schematically illustrating a powder suction and discharge apparatus 200 according to the modification of the present embodiment.

Hereinafter, in the powder suction and discharge apparatus 200 according to the modification of the present embodiment, members having the same functions as the constituting members of the powder suction and discharge apparatus 100 according to the present embodiment described above are denoted by the same reference signs, and the detailed description thereof will be omitted.

As in FIG. 5 illustrates, the powder suction and discharge apparatus 200 is different from the powder suction and discharge apparatus 100 described above in that the powder suction and discharge apparatus 200 includes a vibration mechanism 80.

The vibration mechanism 80 is provided in the housing 40. In the illustrated example, the vibration mechanism 80 is provided on an outer surface of the side wall 44 of the housing 40. The vibration mechanism 80 vibrates the container 20. Specifically, as the vibration of the vibration mechanism 80 is transferred to the container 20 via the housing 40, the container 20 vibrates. The vibration mechanism 80 is configured by, for example, a vibrator and the like.

The vibration mechanism 80 is controlled by the control unit 70. The control unit 70 performs processing for driving the vibration mechanism 80 in the third state in which the valve 30 is open. The control unit 70 may simultaneously perform processing for driving the vibration mechanism 80 and processing for driving the pressurizing mechanism 60.

The powder suction and discharge apparatus 200 includes the vibration mechanism 80 that vibrates the container 20, and in the third state, the vibration mechanism 80 is driven. As a result, in the powder suction and discharge apparatus 200, compared to a case where no vibration mechanism is provided, the powder can be suppressed from adhering to a side wall of the container 20, and the discharge speed of the powder can be stabilized.

The above-described embodiment and modification are examples, and the present disclosure is not limited thereto. For example, each embodiment and each modification can be appropriately combined.

The present disclosure includes the substantially same configurations as the configurations described in the embodiment, for example, configurations having the same function, method, and result, or configurations having the same purpose and effect. In addition, the present disclosure includes configurations in which parts, of the configurations described in the embodiment, that are not essential are replaced. In addition, the present disclosure includes configurations that exhibit the same effect or configurations that can achieve the same purpose as the configurations described in the embodiment. In addition, the present disclosure includes configurations in which known techniques are added to the configurations described in the embodiment.

From the above-described embodiment and modification, the following content can be derived.

One aspect of a powder suction and discharge apparatus includes a pipe, a container that is coupled to the pipe, a valve that opens and closes a passage of the pipe, and a pressure reducing mechanism that causes an internal space of the container to have negative pressure, and in a first state in which the valve is open and the pressure reducing mechanism is driven, powder is sucked into the container through the pipe, in a second state in which the valve is closed, the sucked powder is stored in the container, and in a third state in which the valve is open, the stored powder is discharged through the pipe.

According to the powder suction and discharge apparatus, the powder can be sucked and discharged.

In one aspect of the powder suction and discharge apparatus, a mechanism that blows air to the powder from the container is included, and in the third state, the mechanism may be driven.

According to the powder suction and discharge apparatus, the discharge speed of the powder can be stabilized.

In one aspect of the powder suction and discharge apparatus, the material of the container may be a porous resin.

According to the powder suction and discharge apparatus, the pressure reducing mechanism provided outside the container can cause the internal space of the container to have negative pressure.

In one aspect of the powder suction and discharge apparatus, the valve may be configured with a coupling portion between the pipe and the container and a rod member that is configured to be fit in the coupling portion.

According to the powder suction and discharge apparatus, by moving the rod member, the valve can open and close.

In one aspect of the powder suction and discharge apparatus, the material of the rod member may be a conductive resin.

According to the powder suction and discharge apparatus, the possibility of adhesion of powder to the rod member due to static electricity caused by friction can be reduced.

In one aspect of the powder suction and discharge apparatus, a vibration mechanism that vibrates the container is included and, in the third state, the vibration mechanism may be driven.

According to the powder suction and discharge apparatus, the discharge speed of the powder can be stabilized.

What is claimed is:

1. A powder suction and discharge apparatus comprising:
a pipe;
a container that is coupled to the pipe, the container being made of a porous resin;
a housing accommodating the container;
a valve that opens and closes a passage of the pipe;
a vacuum pump configured to cause an internal space of the container to have negative pressure, the vacuum pump being connected to the housing at a first position such that air in the internal space is sucked by the vacuum pump through a porous resin wall of the container;
a pressurizing pump configured to apply a pressure to the internal space by sending air to the internal space through the porous resin wall, the pressurizing pump being connected to the housing at a second position;
a memory configured to store a program; and
a processor configured to execute the program so as to:
cause the vacuum pump to suck the air after the processor causes the valve to open such that powder is sucked into the container through the pipe;
cause the valve to close while sucking the air such that the sucked powder is stored in the container; and
cause the pressurizing pump to blow the air after the processor causes the valve to open such that the stored powder is discharged through the pipe,
wherein the first position is farther from the valve than the second position.

2. The powder suction and discharge apparatus according to claim 1, wherein
the valve is configured with
a coupling portion between the pipe and the container, and
a rod member that is configured to be fit in the coupling portion.

3. The powder suction and discharge apparatus according to claim 2, wherein
a material of the rod member is a conductive resin.

4. The powder suction and discharge apparatus according to claim 1, further comprising:
a vibrator configured to vibrate the container, wherein
the processor is further configured to cause the vibrator to vibrate the container while the stored powder is discharged through the pipe.

* * * * *